(12) United States Patent
Costin et al.

(10) Patent No.: US 8,936,043 B2
(45) Date of Patent: Jan. 20, 2015

(54) ROTARY VALVE

(75) Inventors: Peter Costin, Avon, OH (US); Ray Riedel, Elyria, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 515 days.

(21) Appl. No.: 13/216,519

(22) Filed: Aug. 24, 2011

(65) Prior Publication Data

US 2012/0049096 A1 Mar. 1, 2012

Related U.S. Application Data

(60) Provisional application No. 61/377,363, filed on Aug. 26, 2010.

(51) Int. Cl.
*F16K 11/074* (2006.01)
*F16K 3/08* (2006.01)

(52) U.S. Cl.
CPC .................................. *F16K 11/0743* (2013.01)
USPC .................................. 137/625.21; 137/625.23

(58) Field of Classification Search
CPC . F16K 11/074; F16K 11/0743; F16K 11/076; F16K 3/085; G01N 30/20
USPC .................. 137/597, 625.23, 625.24, 625.43, 137/625.47, 625.65, 625.15; 251/231, 232, 251/250
See application file for complete search history.

(56) References Cited

U.S. PATENT DOCUMENTS

| | | | |
|---|---|---|---|
| 1,375,205 A | 4/1921 | Budzinsky | |
| 2,745,434 A * | 5/1956 | Stevenson | 137/625.43 |
| 3,368,583 A * | 2/1968 | Weaver | 137/625.46 |
| 3,834,416 A | 9/1974 | Parkison | |
| 3,875,967 A * | 4/1975 | deFries | 137/625.66 |
| 4,241,647 A * | 12/1980 | Herr | 454/336 |
| 4,360,040 A | 11/1982 | Cove et al. | |
| 4,412,556 A * | 11/1983 | Janich | 137/614.11 |
| 4,431,028 A | 2/1984 | Hendrick | |
| 4,603,834 A | 8/1986 | Hendrick | |
| 4,625,763 A * | 12/1986 | Schick et al. | 137/625.15 |
| 4,633,904 A * | 1/1987 | Schumann et al. | 137/625.15 |
| 4,909,476 A | 3/1990 | Messick | |
| 4,977,791 A * | 12/1990 | Erichsen | 74/470 |
| 5,014,736 A | 5/1991 | Korfgen et al. | |
| 5,025,833 A | 6/1991 | Hendrick | |
| 5,088,689 A | 2/1992 | Hendricks et al. | |
| 5,217,046 A | 6/1993 | Woods | |
| 5,924,828 A * | 7/1999 | Lefavour et al. | 408/130 |

(Continued)

FOREIGN PATENT DOCUMENTS

JP 55008575 A 1/1980

*Primary Examiner* — John K Fristoe, Jr.
*Assistant Examiner* — Frederick D Soski
(74) *Attorney, Agent, or Firm* — Renner, Otto, Boisselle & Sklar, LLP

(57) ABSTRACT

A rotary valve includes a valve cap, a valve body, a rotary valve disk, and an actuator. The valve body includes first and second sets of fluid flow passages, with each set having a drain, a fluid inlet, a fluid outlet and a fourth passage connected to the fluid outlet passage. The rotary disk includes first and second connecting passages. The actuator and rotary disk have first and second positions in which various passages of each set of fluid flow passages aligned with and connected by the connecting passages and a third position in which the fluid outlet passage of each set of fluid flow passages is connected to the drain passage of the other set of fluid flow passages.

18 Claims, 17 Drawing Sheets

(56) References Cited

U.S. PATENT DOCUMENTS

| | | | |
|---|---|---|---|
| 6,161,583 A * | 12/2000 | Morris | 137/625.21 |
| 6,352,105 B1 | 3/2002 | Serratto | |
| 6,672,336 B2 * | 1/2004 | Nichols | 137/625.46 |
| 7,779,861 B2 | 8/2010 | Nicolini | |
| 2003/0160199 A1 | 8/2003 | Barels et al. | |
| 2008/0054206 A1 * | 3/2008 | Biester et al. | 251/65 |
| 2009/0133879 A1 * | 5/2009 | Wright et al. | 166/320 |

* cited by examiner ively spaced apart from one
ROTARY VALVE

CROSS REFERENCE TO RELATED APPLICATIONS

The present application claims the benefit of the filing date of U.S. Provisional Application No. 61/377,363, filed Aug. 26, 2010, the disclosure of which is incorporated herein by reference in its entirety.

TECHNICAL FIELD

This invention relates to a rotary valve. More specifically, this invention relates to a rotary valve having a rotatable valve disk and a rotating shaft, with multiple flow passage sets or valving areas.

BACKGROUND OF THE INVENTION

Rotary valves are known. For example, U.S. Pat. No. 6,932,112 B2 discloses a valve that is configured to receive a fluid from one or more sources and to distribute the fluid to one or more outlet ports. The valve includes first and second members that form a cavity for receiving a rotatable valve disk for directing the fluid to one or more outlet ports.

SUMMARY OF THE INVENTION

At least one embodiment of the present invention discloses a rotary valve comprising a valve block, a cavity having a radially extending wall provided by the valve block, a valve disk rotatably disposed in the cavity, the valve block having a first and a second flow passage set, the first and second flow passage sets being circumferentially spaced apart from one another relative to a longitudinal axis of the valve block and valve disk, the first and second flow passage sets each including at least three circumferentially spaced apart longitudinally extending flow passages opening longitudinally into the cavity, the valve disk including at least one control passage, the valve disk having a first position in which a valve disk control passage is aligned with two flow passages of the first set of flow passages in the valve block and a second position in which a valve disk control passage is aligned with two flow passages of the second set of flow passages in the valve block.

BRIEF DESCRIPTION OF THE DRAWINGS

Embodiments of this invention will now be described in further detail with reference to the accompanying drawings, in which.

DETAILED DESCRIPTION OF THE INVENTION

Figure 1:
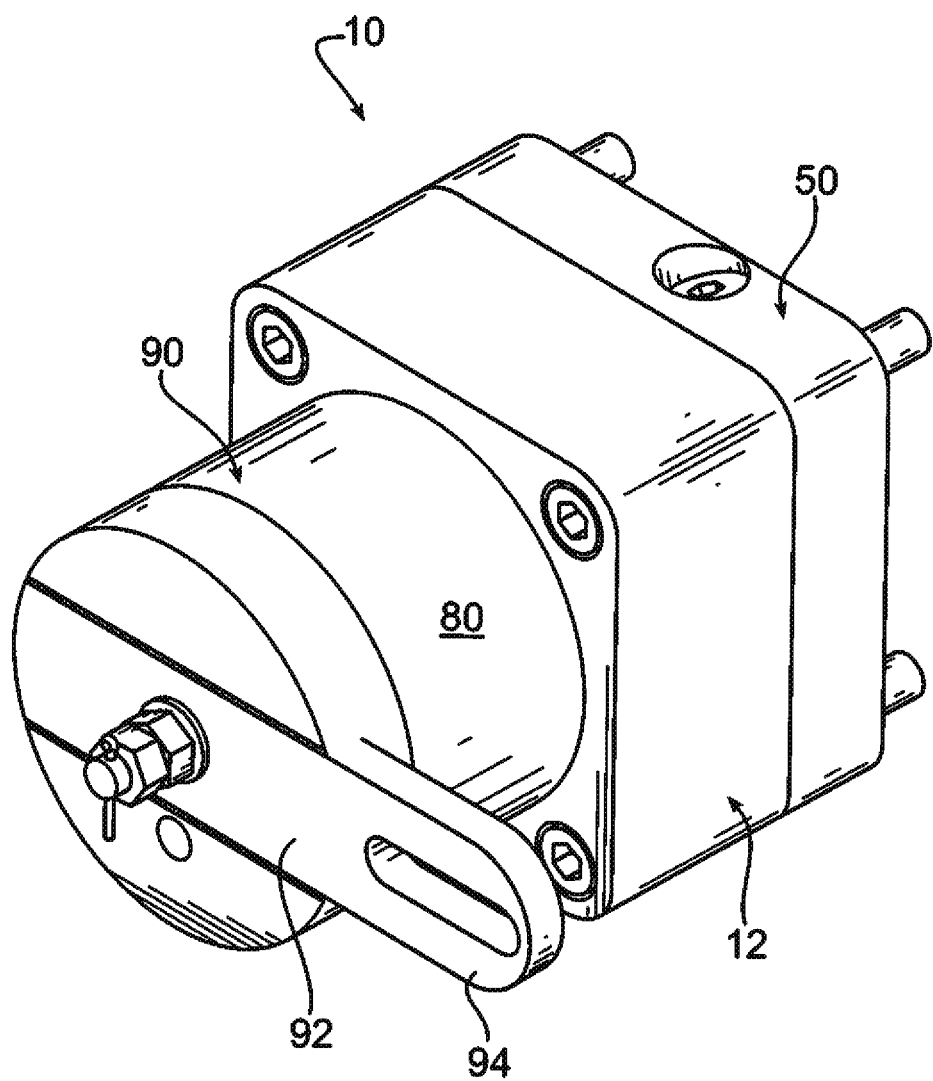
FIG. 1 is perspective view of a rotary valve according to an embodiment of this invention.

Referring now to the drawings in greater detail, the principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

An embodiment of a rotary valve 10, constructed in accordance with the present invention, is illustrated in FIGS. 1-28. As shown in FIGS. 1-3 and 28, the rotary valve 10 includes a valve block or valve cap 12, a valve disk 30, a valve block or valve body 50, and a valve actuator 90, 140. The valve block 12 Is further illustrated in FIGS. 4-10, and the valve disk 30 is further illustrated in FIGS. 20-25 and 28. The valve block 50 is further illustrated in FIGS. 11-19 and 26, and the valve actuator 90, 140 is further illustrated FIG. 28. The valve block 12, valve disk 30, and valve block 50 are each disposed along a common longitudinal axis 100. The materials used for the rotary valve 10 are all well know materials, including suitable steel and/or stainless steel for the components 30, 50, 90, 140 and suitable polymeric materials for the seals. Any suitable materials may be used.

Figure 7:
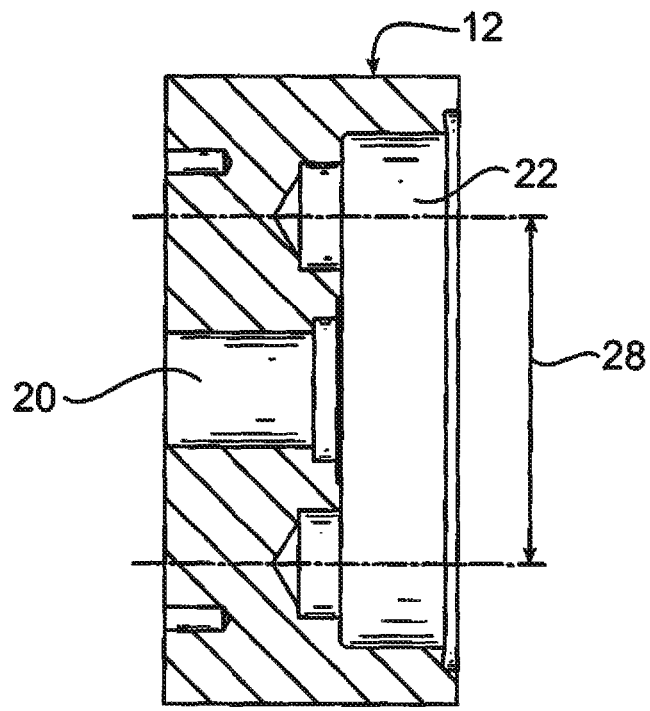
FIG. 7 is a cross sectional view taken along reference view line 7-7 in FIG. 6.
Figure 8:
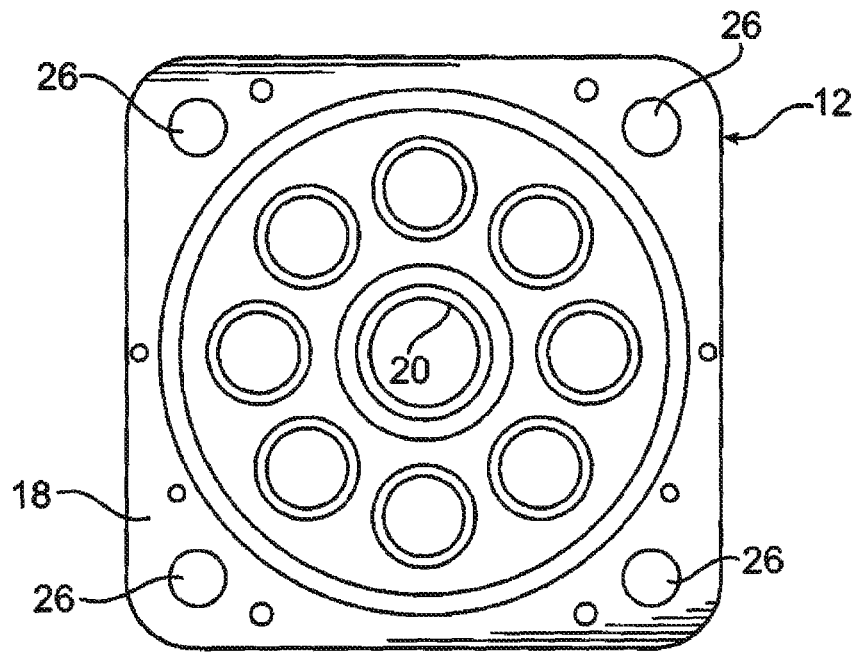
FIG. 8 is a rear elevation view of the valve cap of the rotary valve shown in FIG. 1.
Figure 9:
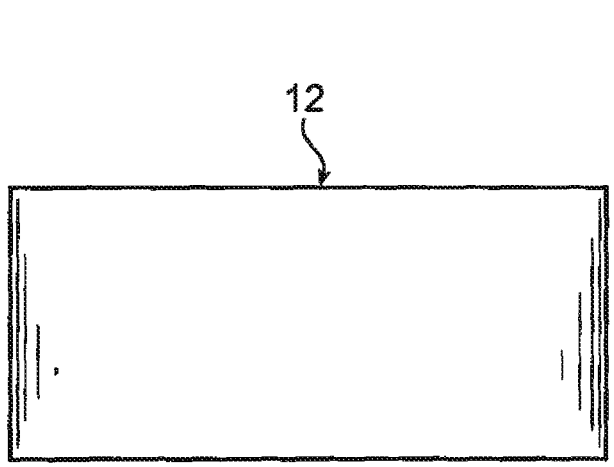
FIG. 9 is a top elevation view of the valve cap of the rotary valve shown in FIG. 1.
Figure 10:
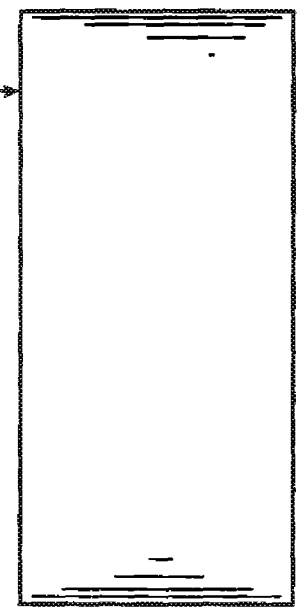
FIG. 10 is a side elevation view of the valve cap of the rotary valve shown in FIG. 1.
Figure 11:
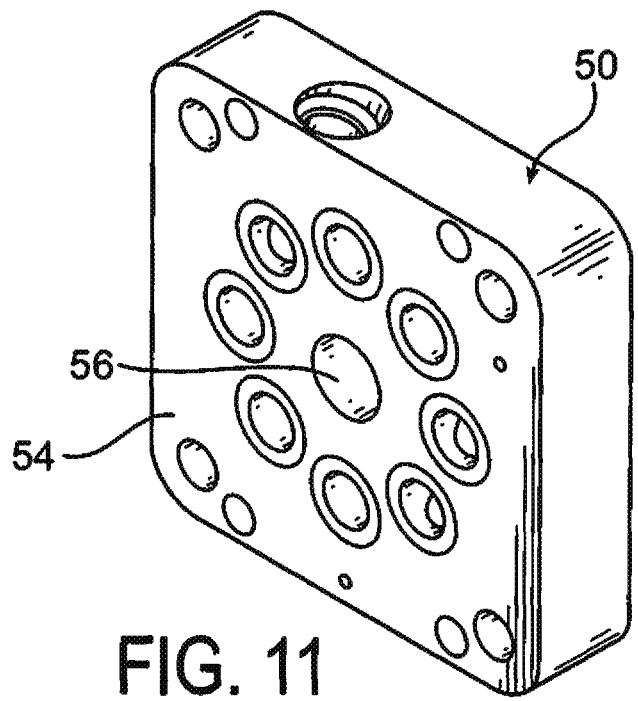
FIG. 11 is a perspective view showing the back of the valve body of the rotary valve shown in FIG. 1.

Referring now to FIGS. 3 and 4-10, the valve block or valve cap 12 includes oppositely facing first and second side surfaces or walls 16 and 18, each with a generally square profile and each extending in a radial direction and being disposed in a plane that is generally perpendicular to the longitudinal axis 100. A through-hole 20 extends longitudinally from the first side wall 16 and terminates in a circular recess 22 defined between the valve blocks 12 and 50 and formed in the second side wall 18. The circular recess 22 is sized for receiving the valve disk 30, which is further described below. A plurality of threaded holes 24 (FIG. 5), each for receiving a fastener 32 (FIG. 3), extends into the first side wall 16 of the valve block 12 at a spaced distance from the through-hole 20. Additionally, through-holes 26 (FIG. 5), each for receiving a larger fastener 28 (FIG. 3) extend through the valve block 12 from the first side wall 16 to the second side wall 18. The wall 18 of the valve block 12 defines one side of the cavity 22 and is substantially adjacent an oppositely facing wall of the valve disk 30 described further below. The wall 18 of the valve block 12 includes a plurality of circumferentially spaced blind holes arranged at the base of the circular recess 22 around the central longitudinal axis 100 and through-hole 20. These blind holes are arranged radially outwardly from the longitudinal axis 100, with their center points arranged around a circle with diameter 28 (FIG. 7). The blind holes receive suitable seals 34 for sealing between the valve block 12 and the valve disk 30 when the valve disk 30 is assembled in the central recess 22. The seals 34 are known, and in the embodiment shown the seals each may be a stack of O-ring seals, back up seals, and a spring washer to bias one of the O-ring seals against the valve disk 30. Alternatively, the seals 34 may be similar to seals carried in the valve block 50 described further below.

Figure 12:
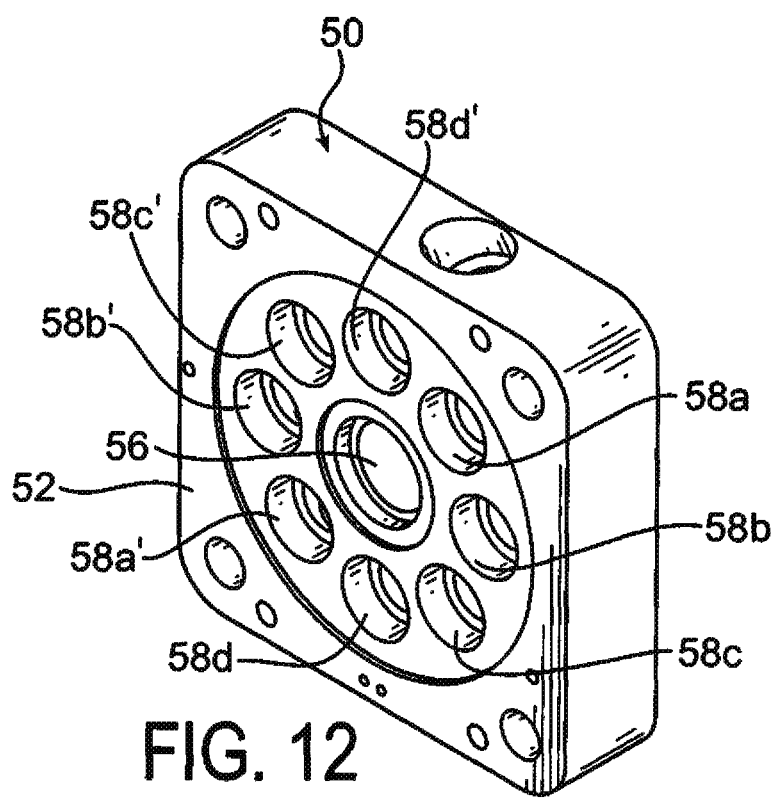
FIG. 12 is a perspective view showing the front of the valve body of the rotary valve shown in FIG. 1.
Figure 13:
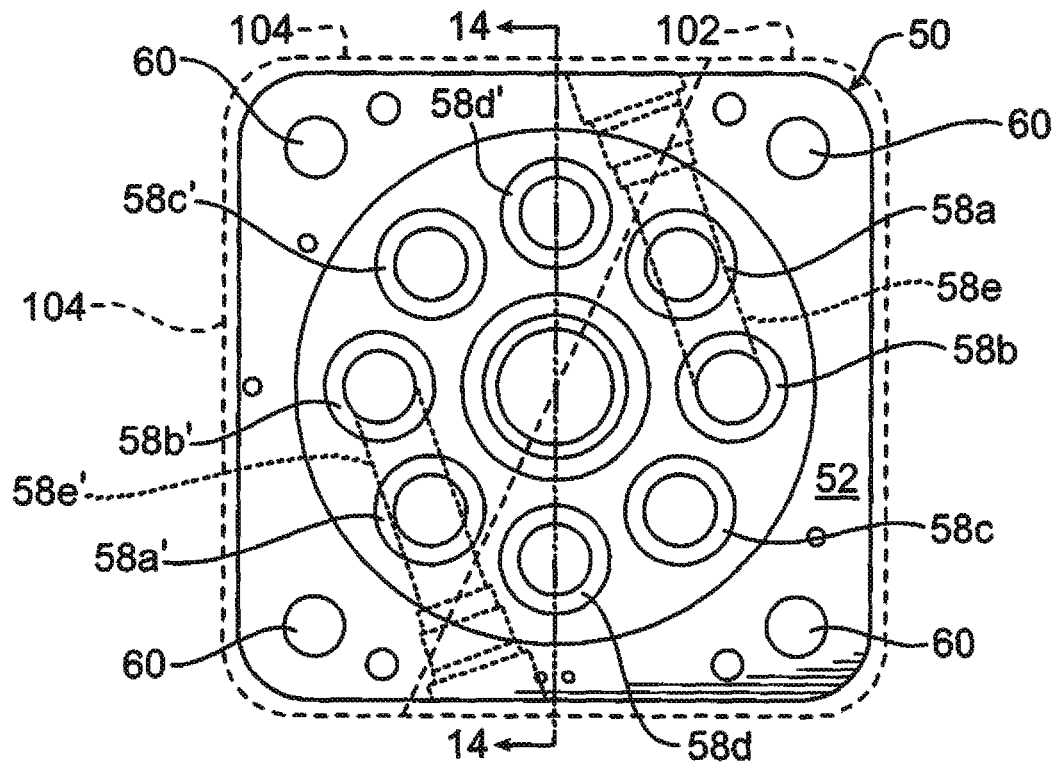
FIG. 13 is a front elevation view of the valve body of the rotary valve shown in FIG. 1, with various valving areas or flow passage sets illustrated in dashed outline.
Figure 14:
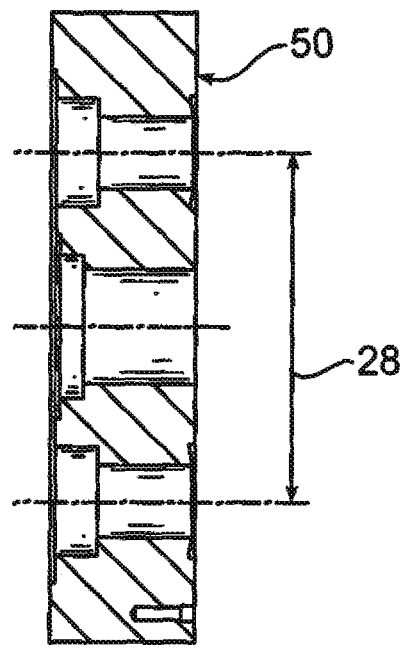
FIG. 14 is a cross sectional view taken along reference view line 14-14 in FIG. 13.
Figure 15:
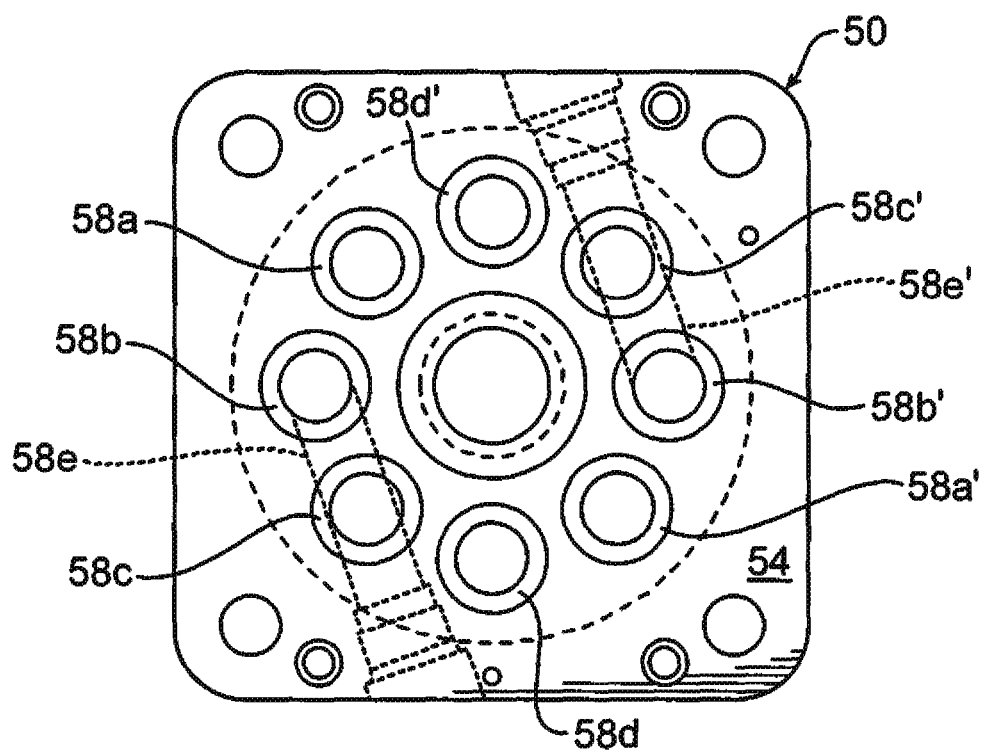
FIG. 15 is a front elevation view of the valve body of the rotary valve shown in FIG. 1, with various internal passages of the valve body illustrated in dashed outline.
Figure 16:
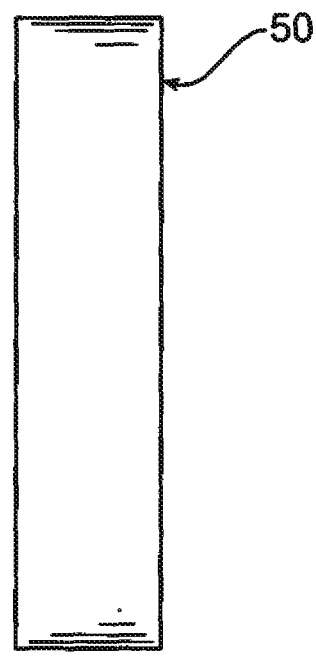
FIG. 16 is a side elevation view of the valve body of the rotary valve shown in FIG. 1.
Figure 17:
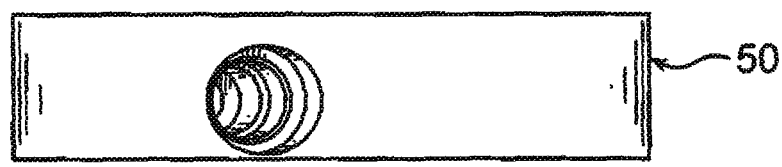
FIG. 17 is a side elevation view of the other side of the valve body of the rotary valve shown in FIG. 1.
Figure 18:
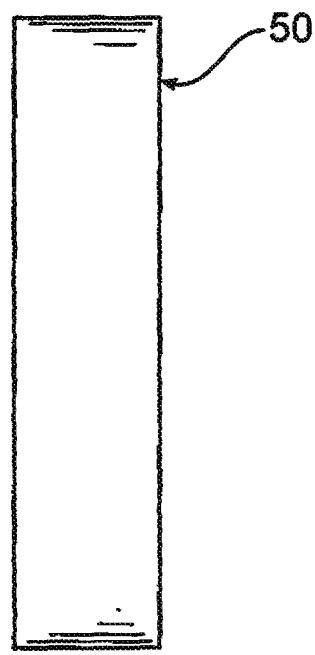
FIG. 18 is a bottom elevation view of the valve body of the rotary valve shown in FIG. 1.
Figure 19:
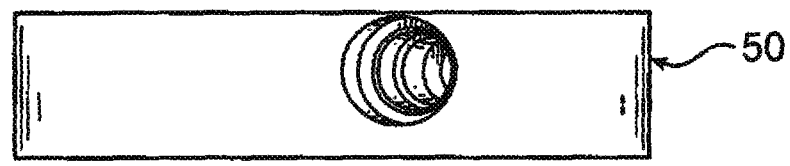
FIG. 19 is a top elevation view of the valve body of the rotary valve shown in FIG. 1
Figure 20:
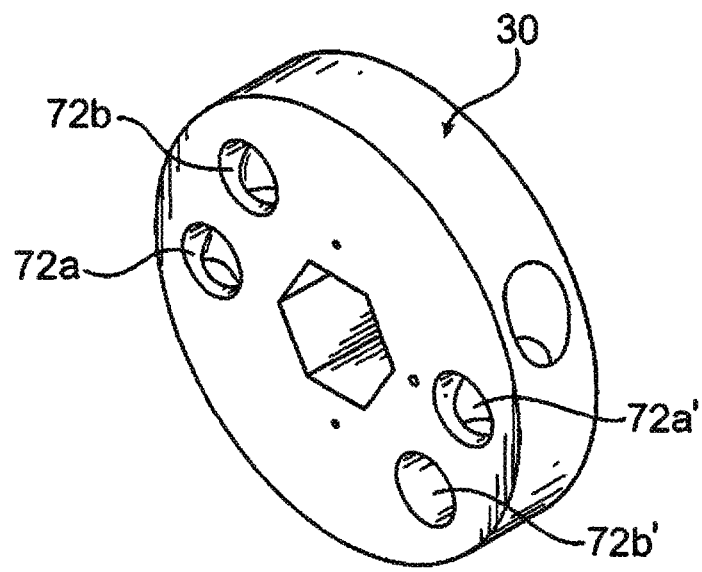
FIG. 20 is a perspective view of the valve disk of the rotary valve shown in FIG. 1.

Referring now to FIGS. 3, 11-19 and 26, the valve block or valve body 50 also includes oppositely facing first and second side walls 52 and 54, each having a generally square profile and extending in a radial direction and being disposed in a plane that is generally perpendicular to the longitudinal axis 100. The first side wall 52 of the body 50 is equal in size to the second side wall 18 of the valve block 12 such that when abutting, the oppositely facing walls 18 and 52 cooperatively define and provide longitudinally oppositely facing walls of a generally cylindrical cavity or recess 22. A central through-hole 56 extends through the valve block 50 from the first side wall 52 to the second side wall 54. A bronze bearing (not shown) may be inserted into the right side of the through-hole 56 as viewed in FIG. 14 for supporting a shaft as further described below. In the illustrated embodiment, eight holes or longitudinally extending flow passages or ports 58a-58d and 58a'-58d' (FIG. 12) extend longitudinally through the valve block 50 open longitudinally into the cavity 22 through the first side wall 52. These eight fluid flow passages are arranged radially outwardly from the longitudinal axis 100 in a circumferentially spaced array, for example with their center points arranged around circle diameter 28 (FIG. 14). At least six of the eight passages extend longitudinally completely through the valve block 50 and open to and terminate at the second side wall 54. The two flow passages that optionally may terminate prior to the second side wall 54 are labeled 58a and 58a' in FIG. 12. If extending flow passages 58a and 58a' to the second side wall 54 is desired for manufacturing purposes, an end of the flow passages at the second side wall 54 may be blocked using a plug or an adjacent blocking surface of another structure. Each of the fluid flow passages 58a and 58e is connected by a respective internal flow passage (shown in dashed outline in FIGS. 13 and 15) to the flow passage located immediately adjacent in one circumferential direction. For example, in the illustrated embodiment, fluid flow passage 58a is connected to fluid flow passage 58b by an internal flow passage 58e and fluid flow passage 58a' is connected to fluid flow passage 58b' by an internal flow passage 58e'. The flow passages 58e and 58e' may be formed by cross drilling between the respective connected passages within the valve block 50, with the opening to the drilled hole being plugged. Additionally, threaded blind holes 60 (FIG. 13) for receiving threaded ends of the larger fasteners 28 (FIG. 3) extend into the first side wall 52 of the body 50. The larger fasteners 28 affix the valve block or valve body 50 to the valve block or valve cap 12 in a fluid tight relationship, so that the valve disk 30 is captured in the recess 22 and fluid in the recess 22 may not leak outside of the rotary valve 10. The fluid flow passages 58a-58d and 58a'-58d' in the first side wall 52 of the body 50 each receive and support a known seal 62, such as a known O-ring or metal slipper, for sealing between the valve block 50 and the valve disk 30. In the embodiment shown, the seals 62 are metal slippers such as for example illustrated in FIG. 26, and the sealing surface of each metal slipper that engages the valve disk 30 is polished to minimize fluid leakage between the slipper and the valve disk 30.

Figure 21:
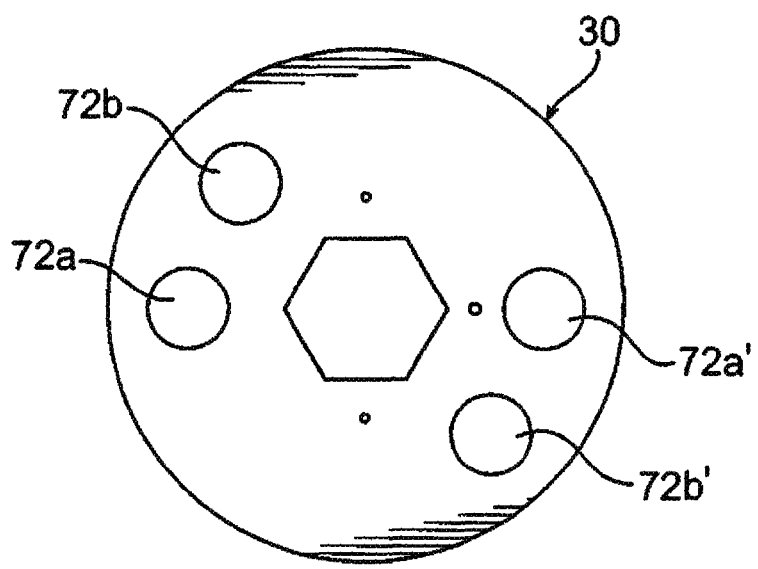
FIG. 21 is a front elevation view of the valve disk of the rotary valve shown in FIG. 1.
Figure 22:
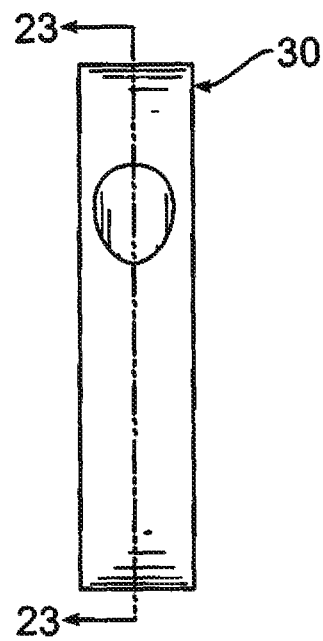
FIG. 22 is a side elevation view of the valve disk of the rotary valve shown in FIG. 1.
Figure 23:
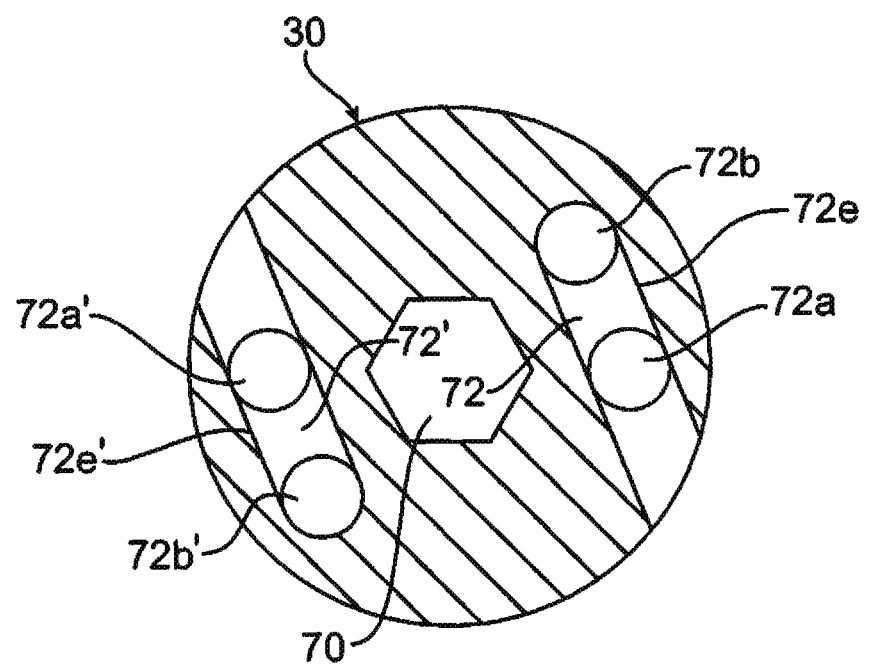
FIG. 23 is a cross sectional view taken along reference view line 23-23 in FIG. 22.
Figure 24:
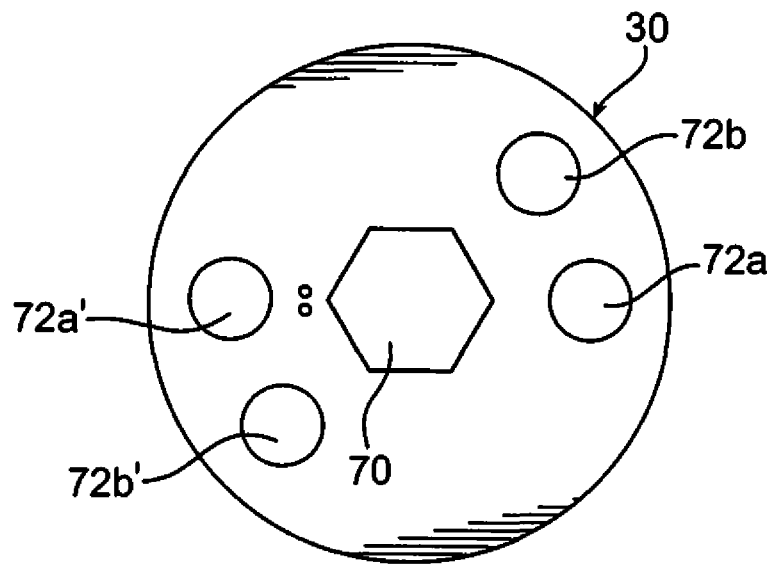
FIG. 24 is a rear elevation view of the valve disk of the rotary valve shown in FIG. 1.
Figure 25:
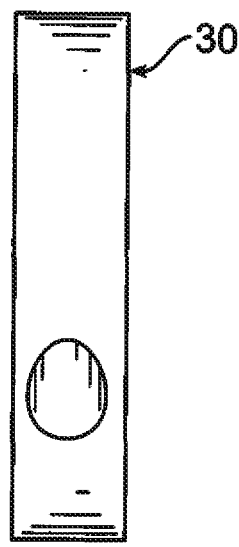
FIG. 25 is a side elevation view of the other side of the valve disk of the rotary valve shown in FIG. 1.
Figure 26:
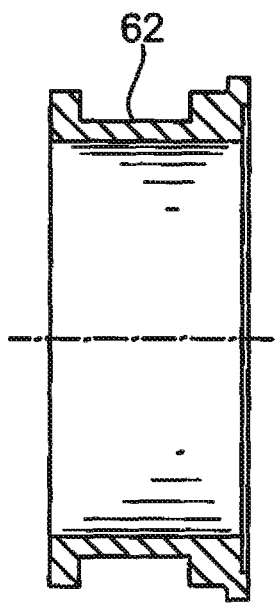
FIG. 26 is a cross sectional view of one of the valve slippers of the rotary valve shown in FIG. 1.
Figure 27A:
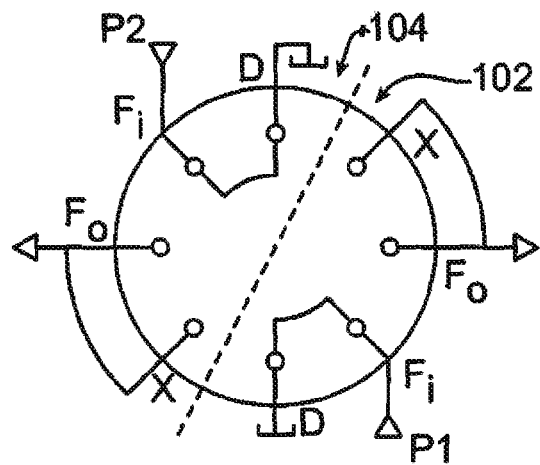
FIG. 27 is a schematic circuit diagram illustrating various positions of the valve disk of the rotary valve shown in FIG. 1.
Figure 27B:
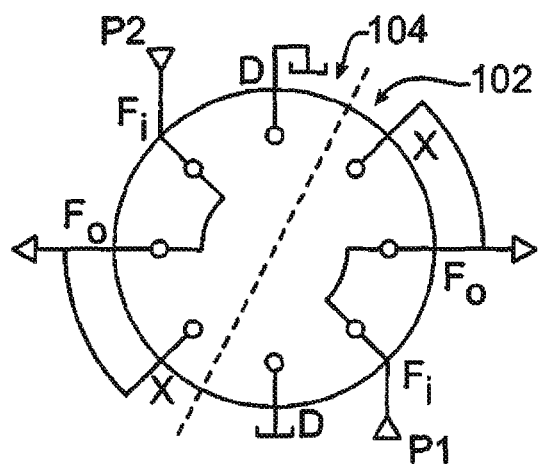
Figure 27C:
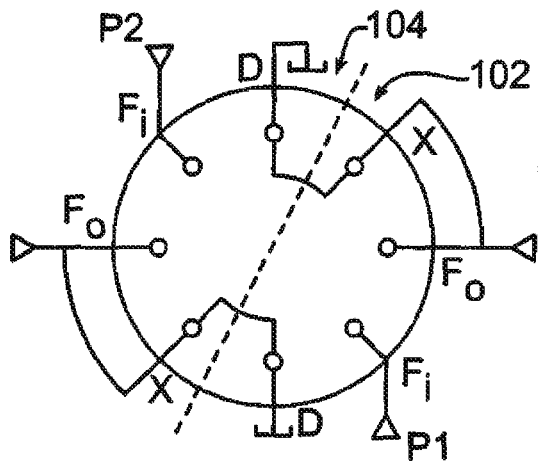

Referring now to FIGS. 3, 20-25 and 27-28, the valve disk 30 is rotatable relative to the valve block or valve cap 12 and valve block or valve body 50. The valve disk 30 is sized for being received in the cavity formed by the circular recess 22 in the valve cap 12 and for sealing against the seals 34 and 62 secured respectively to the second side wall 18 of the valve block 12 and the first side wall 52 of the valve block 50. The valve disk 30 includes a central through-hole 70, which is hexagonal in the illustrated embodiment. Further, the valve disk 30 includes at least four circumferentially spaced through-holes 72a-72b and 72a'-72b' located radially outwardly from the longitudinal axis 100, with their center points arranged around circle diameter 28 (FIG. 21). The holes 72a-72b and 72a'-72b' are arranged for longitudinal registry with the through-holes 58a-58d and 58a'-58d' in the valve block 50. In the illustrated embodiment, two of the through-holes are located near one another on one side of the valve disk 30 and, the other two through-holes are located near one another on the opposite side of the valve disk relative to the central opening 70. A flow passage 72e and 72e' (FIG. 23) extends through the valve disk 30 to connect adjacent through-holes. The flow passages 72e and 72e' can be made by cross-drilling between through-holes as shown in FIG. 23. In the illustrated embodiment, flow passage 72e connects through-hole 72a with through-hole 72b to provide one connecting passage 72 in the valve disk 30, and flow passage 72e' connects through-hole 72a' with through-hole 72b' to provide another connecting passage 72'.

Figure 2:
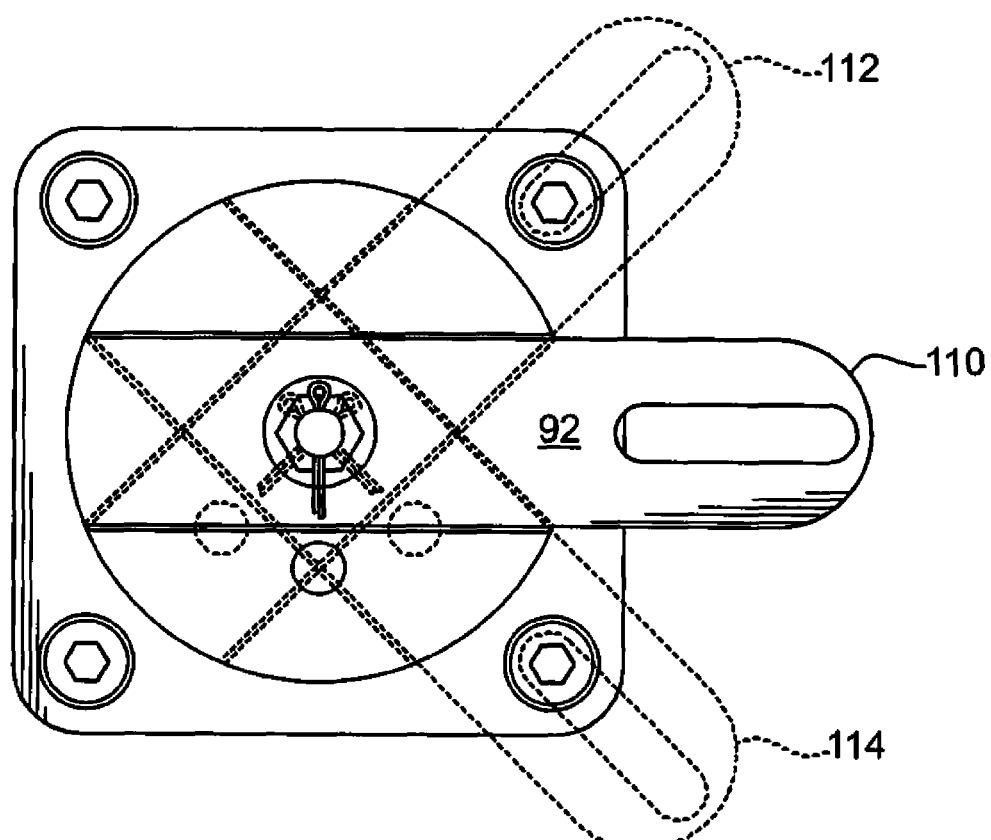
FIG. 2 is a front elevation view of the rotary valve shown in FIG. 1, with various operating configurations of the valve shown in dashed outline view.
Figure 3:
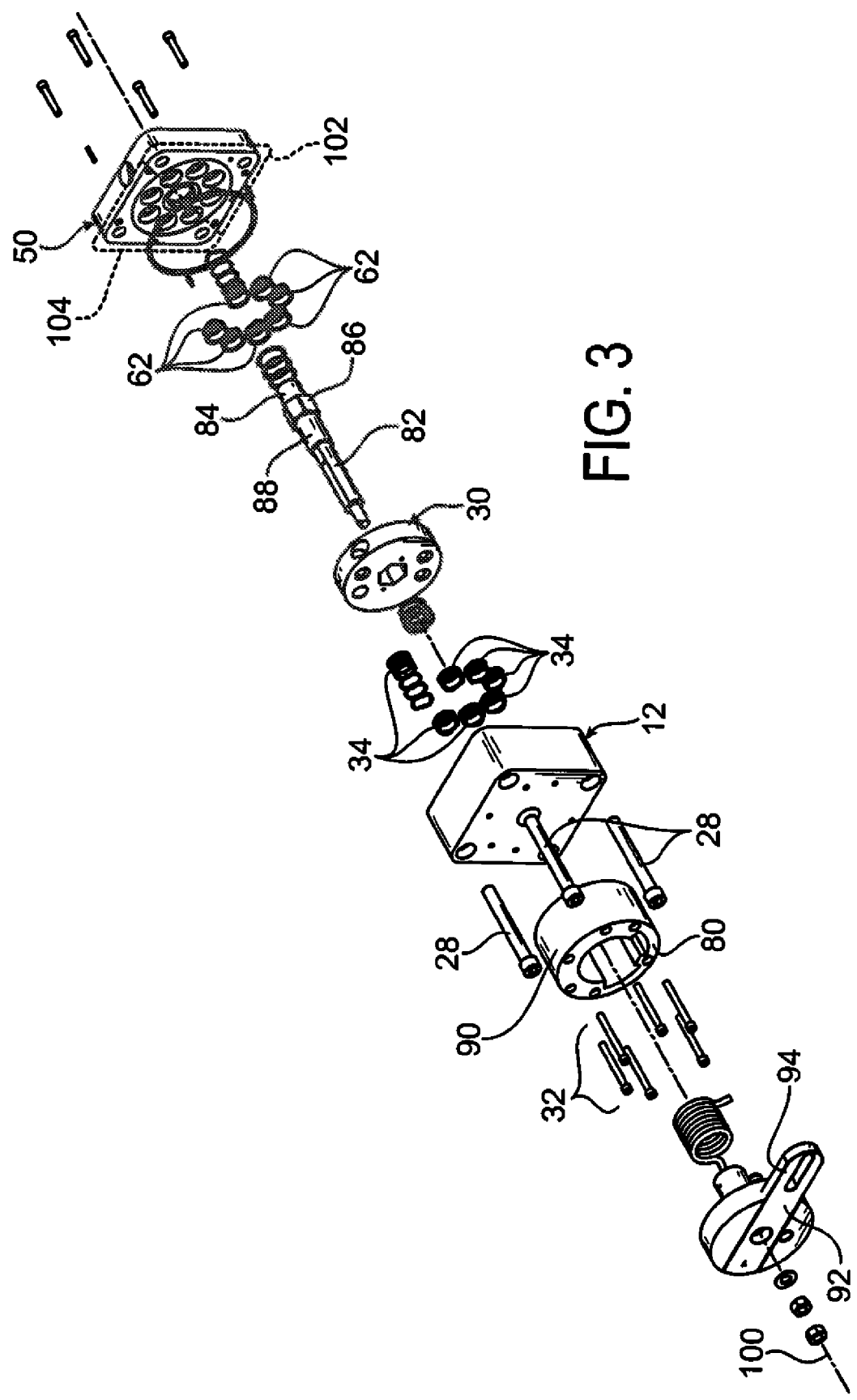
FIG. 3 is an exploded perspective view of the rotary valve shown in FIG. 1.
Figure 4:
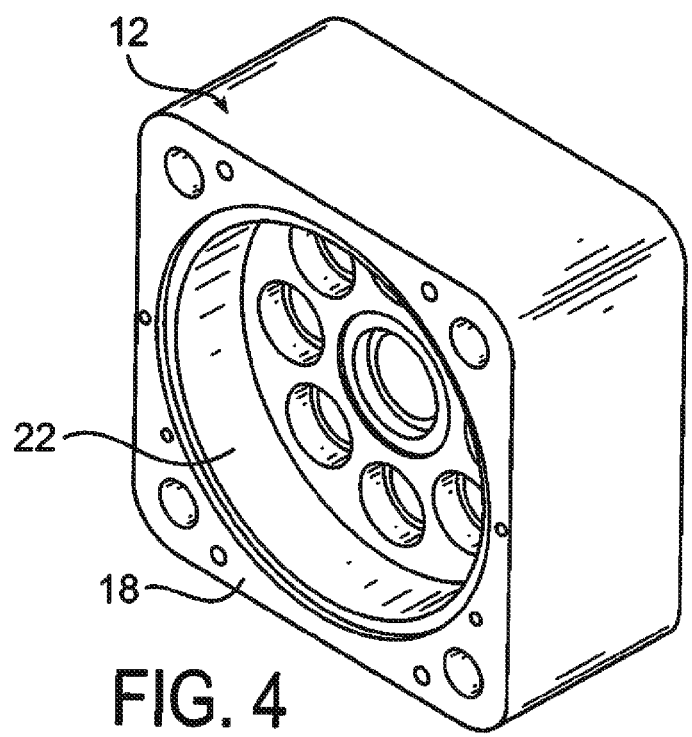
FIG. 4 is a perspective view showing the back of the valve cap of the rotary valve shown in FIG. 1.
Figure 5:
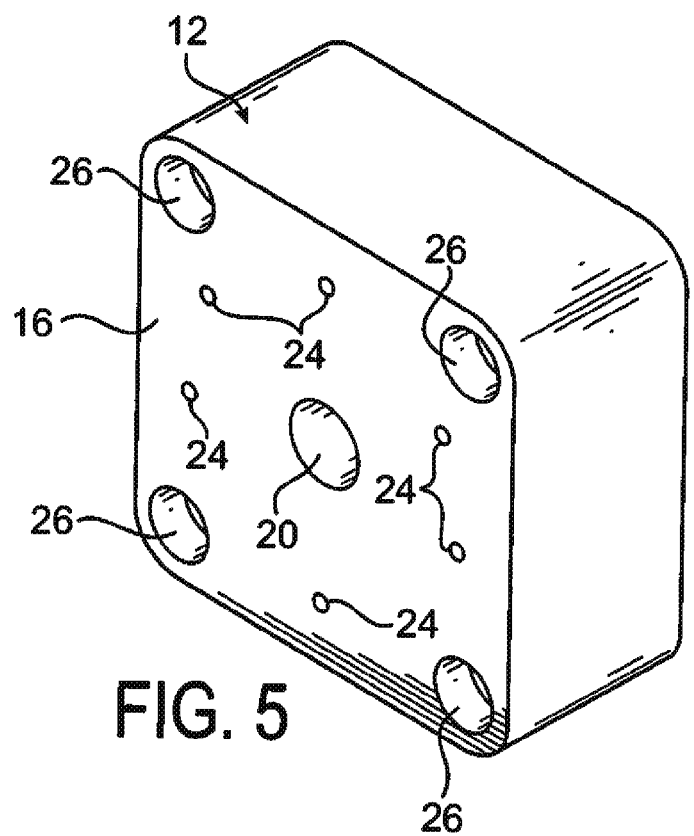
FIG. 5 is a perspective view showing the front of the valve cap of the rotary valve shown in FIG. 1.
Figure 6:
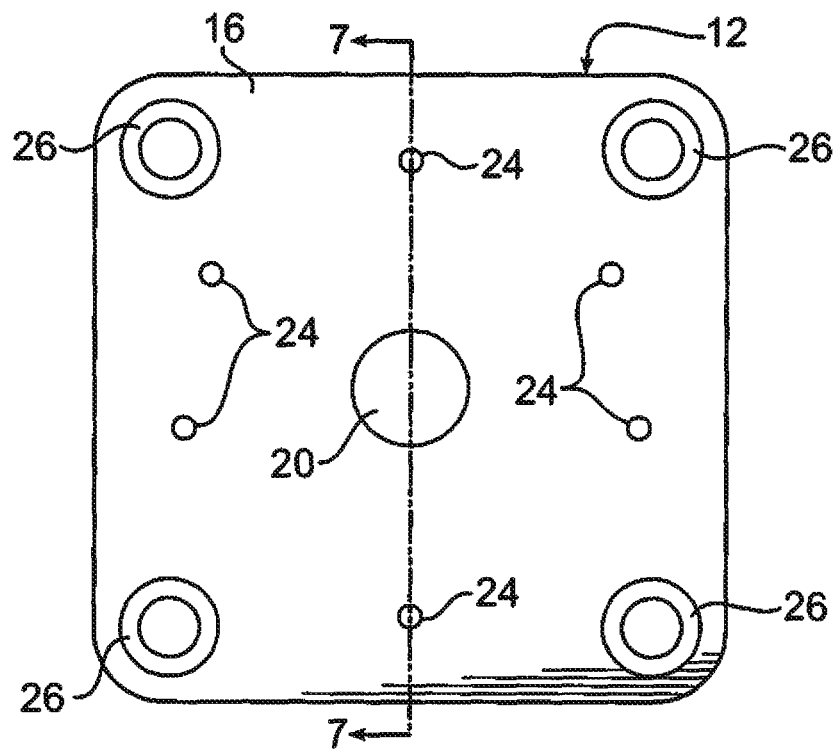
FIG. 6 is a front elevation view of the valve cap of the rotary valve shown in FIG. 1.

Referring now to FIGS. 1-3 and 28, actuator 90, 140 includes a longitudinally extending actuator shaft 82 having opposite first and second ends. At or nearest to one end of the shaft 82 is a portion 84 that is sized for being rotatably received in and supported by the above described bronze bearing in the central through-hole 56 of the valve block 50. The shaft 82 further includes a shaped portion 86 that is sized for being received in the central through-hole 70 of the valve disk 30. FIG. 3 illustrates the shaped portion 86 as being hexagonal for being received in driving engagement with hexagonal opening 70 of the valve disk 30. Alternatively, other shapes and structures for fixing the shaft portion 84 and the valve disk 30 for rotational movement together may be used. Adjacent the shaped portion 86 of the shaft 82 opposite the one end is a portion 88 for being rotatably received in the valve block 12. In the illustrated embodiment, the shaft 82 extends beyond the first side wall 18 of the valve cap 12, through an annular hub housing 80 (FIG. 3) and is connected to a handle 92 for rotational movement with the handle 92. A torsion spring (FIG. 3) may be disposed in the annular hub housing 80 and may act between the handle 92 and the hub housing 80 to bias the handle 92 toward a center position described further below. The handle 92 includes a slotted portion 94 for enabling a device described further below that moves linearly to act upon the handle 92 for rotating the handle 92 and thus, the shaft 82 and valve disk 30, relative to the valve cap 12 and body 50. Alternatively, other means of rotating the shaft 82 and/or valve disk 30 may be employed, for example, a motor such as an electric servo or stepper motor or fluid operated motor.

Referring now to FIGS. 3 and 13, the rotary valve 10 includes at least two valving areas or sets of fluid flow passages 102 and 104. The valving areas or flow passage sets 102 and 104 are encompassed within the portions of the rotary valve 10 illustrated by dashed lines defining three dimensional boxes 102 and 104. Each of the flow passage sets 102 and 104 includes all of the holes in the valve blocks 12 and 50 located within its associated dashed lines. As described above, the valve disk 30 is located in the cavity 22 formed by the valve block 12 and the valve block 50. The rotary valve 10 further includes multiple rotational positions of the valve disk 30 within the cavity 22 for each of the sets of flow passages 102 and 104. Rotational movement of the handle 92 causes rotation of the shaft 82 relative to the valve block 50, and this rotational movement of the shaft 82 causes rotation of the valve disk 30 in the cavity 22 relative to the valve blocks 50 and 12. The rotational position of the valve disk 30 relative to the valve block 50 controls the flow of fluid through each flow passage set 102 and 104. The flow passage sets or valving areas 102 and 104 and the connecting passages 72 and 72' may be arranged so that flow through each flow passage set is similar for an associated rotational position of the valve disk 30 relative to the valve block 50. Alternatively, flow through the various flow passage sets or valving areas 102 and 104 may differ for an associated position of the valve disk 30. Also, one of the connecting passages 72 and 72' may be of different configuration than the other, or even eliminated, to provide still other options for the configuration of the rotary valve 10. In the illustrated embodiment, as described further below, the fluid flow through the flow passage sets 102 and 104 is similar for an associated position of the valve disk 30 relative to the valve block 50.

FIG. 12 illustrates the various holes or fluid flow passages in the valve block 50 described above, and FIG. 27*a* is a schematic fluid circuit diagram illustrating the function of each of these holes or passages as it relates to each valving area or flow passage set 102 and 104. As described above, passages 58*a* and 58*a'* in valve body 50 are blocked. Passages 58*c* and 58*c'* function as fluid inlet ports Fi for their respective valving areas 102 and 104. When the rotary valve 10 is connected to a system or manifold as further described below, an inlet conduit or passage from a source of fluid pressure and flow P1 for valving area or flow passage set 102 is in fluid communication or connection with hole 58*c*. Similarly, another inlet conduit or passage from the same or a different source of fluid pressure and flow P2 for valving area or flow passage set 104 is in fluid communication or connection with hole 58*c'*. Holes 58*b* and 58*b'* function as fluid outlet ports Fo for their respective flow passage sets 102 and 104. When connected to a system or manifold as described further below, an outlet conduit or passage in fluid communication with a device that is to receive fluid from the sources P1 and/or P2 is in fluid connection with holes 58*b* and 58*b'*. Flow passages 58*d* and 58*d'* function as drain ports D for their respective flow passage sets 102 and 104. When connected to a system or manifold, a drain conduit or passage is in fluid communication with a drain tank(s) or similar fluid device(s) is in fluid connection with holes 58*d* and 58*d'*. In the embodiment shown, the fluid inlet flow passages Fi are located circumferentially between the fluid outlet flow passages Fo and the fluid drain flow passages D along a minor arc through the fluid drain passage and the fluid outlet passage. A minor arc is an arc of a circle having measure less than or equal to 180° ($\pi$ radians). Other fluid outlets or fluid inlets or drains or other functions could alternatively be connected to the flow passages 58*a*-58*d* and 58*a'*-58*d'* of each set of flow passages 102 and 104.

Referring to FIGS. 1-3 and 27, each valving area or flow passage set 102 and 104 of the valve 10 has three different functions depending upon the relative position of the valve disk 30 and the body 50. These three functions include a function that connects a first flow passage to a second flow passage and blocks a third flow passage of each flow passage set 102 and 104 as illustrated in FIG. 27*a*, a function that blocks the first flow passage and connects the second and third flow passages of each flow passage set 102 and 104 as illustrated in FIG. 27*b*, and a function that blocks the first and second and third fluid flow passages of each flow passage 102 and 104 from one another and that connects one of the flow passages of each sets to a flow passage of the other sets. Each function is associated with a position of the handle assembly 80 and valve disk 30 relative to the valve block 50. In the illustrated embodiment, the handle 92 is rotatable between three positions, each of which is associated with one of the above functions. A central position 110 of the handle 92 shown by solid lines in FIG. 2 is associated with the function that aligns the connecting passages 72 and 72' of the valve disk 30 with and connects a first one of the fluid flow passages and a second one of the fluid flow passages of each fluid flow passage set 102 and 104. In the embodiment shown, for example, the drain D fluid flow passage is connected to the inlet Fi fluid flow passage of each fluid flow passage set 102 and 104 by alignment with the connecting passages 72 and 72' as illustrated in FIG. 27*a*. Another position 114 of the handle 92 shown by dashed lines in FIG. 2 is forty-five degrees clockwise of the central position 110 and is associated with the function that misaligns the connecting passages 72 and 72' of the valve disk 30 with the drain flow passages D and that aligns the connecting passages 72 and 72' of the valve disk 30 with the second and a third fluid flow passage of each set of flow passages 102 and 104. In the embodiment shown, this position of the handle 92 and valve disk 30 misaligns the connecting passages 72 and 72' with the drain passage D of each flow passage set 102 and 104 and connects the fluid inlet flow passage Fi to the fluid outlet flow passage Fo of each flow passage set 102 and 104 as illustrated in FIG. 27*b*. Another position 112 of the handle 92 shown by dashed lines in FIG. 2 is forty-five degrees counterclockwise of the central position 110 and is associated with the function that, for example, misaligns the connecting passages 72 and 72' with the inlet flow passage Fi and drain flow passage D of its associated set of flow passages 102 and 104 and that aligns the connecting passages 72 and 72' with and connects the outlet flow passage Fo of each set of flow passages 102 and 104 to the drain flow passage D of the other set of flow passages, as illustrated in FIG. 27c. While each flow passage set 102 and 104 preferably includes at least three fluid flow passages (for example, D, Fi and Fo), in the preferred embodiment each flow passage set 102 and 104 includes four flow passages (D, Fi, Fo and X). The X flow passage is in open fluid communication or connection with the Fo flow passage through a passage in the valve block 50 under all operating conditions, so that alignment of one of the connecting passages 72 or 72' of the valve disk 30 with the X flow passage establishes functional alignment with its associated fluid out flow passage Fo. One skilled in the art, however, should understand that the positions of the various functions, inlets, outlets, drains and other passages may be changed.

Certain of the flow passages in the valve block 50 are in fluid connection through the valve body 50 under all operating positions (for example, fluid passages X and Fo of each flow passage set), white other holes in the valve block 50 are selectively connected and disconnected through the valve disk 30. As seen in FIG. 13, the holes 58a-58b of the valving area 102 are in fluid connection through passage 58e, so that the holes 58a- 58b are in fluid connection under all operating conditions and positions. Similarly, the holes 58a'-58b' of the valving area 104 are in fluid connection through passage 58e', so that the holes 58a'-58b' are in fluid connection under all operating functions and positions. These connections or passages or holes 58e and 58e' provide fluid connection within the valve body 50 and maintain fluid connection between the outlets Fo and passages or ports X of each valving area or flow passage set 102 and 104 under all operating functions and positions, as illustrated schematically in FIGS. 27a-27c. Certain of the functions and positions of the rotary valve 10 provide intra-valving area operation, while other functions and positions of the rotary valve 10 provide cross valving area operation. The FIG. 27a function that connects the inlets Fi to drain D and the FIG. 27b function that connects the inlets Fi to the outlets Fo are intra-valving area functions. In these functions and positions, only the passages of each valving area or flow passage set 102 and 104 are used for the functions of those valving areas. The position illustrated in FIG. 27c, which connects the outlets Fo of each valving area 102 and 104 to drain D of the other valving area, is a cross valving area function. In this function, flow passages in the valve block 50 associated with valving area 102 are used with a function of valving area 104. This is accomplished by the passage 58d (which is the X passage) of valving area 102 providing a fluid flow path from fluid outlet Fo of valving area 102 to drain D of valving area. Similarly, passages in the body 50 associated with valving area 104 are used with a function of valving area 102. This is accomplished by the passage 58d' of valving area 104 providing a fluid flow path from fluid outlet Fo of valving area 104 to drain D of valving area 102.

As described above, during operation of the rotary valve 10, when the handle 92 is in the central position 110 (FIG. 27a), the fluid inlet Fi in each valving area or flow passage set 102 and 104 is connected to drain D and the outlet Fo of each valving area 102 and 104 is blocked. In this position, fluid supplied to the inlets Fi passes through the valve body inlet hole 58c and 58c' of each valving area 102 and 104, through the valve disk 30 by passing into through-hole 72a or 72a' and through the flow passage 72e or 72e' and out the other through-hole 72b or 72b', and out the drain hole 58d or 58d' of the body 50. In this position, the inlet hole and the drain hole for each flow path of each valving area 102 and 104 are within the same valving area, for example holes 58c and 58d are in valving area 102 and holes 58c' and 58d' in valving area 104.

When the handle 92 is rotated to connect the inlet Fi and the outlet Fo of each valving area (FIG. 27b), the drain D of each valving area 102 and 104 is blocked. In this position, fluid supplied to the inlets Fi passes through the inlet hole 58c and 58c' of each valving area 102 and 104, through the valve disk 30 by passing into a through-hole and through the flow passage 72e or 72e' and out the other through-hole, and out the outlet hole 58b or 58b' of the body 50. In this position, the inlet hole Fi and the outlet hole Fo for each flow path are within the same valving area 102 or 104. When the handle 92 is rotated to connect the outlets Fo and the drain D (FIG. 27c), the fluid inlet Fi and the fluid outlet Fo and the drain D of each valving area 102 and 104 are blocked from one another. The outlet Fo of one valving area 102 is connected to the drain D of the other valving area 104, and vise-versa. In this position, a flow path extends through the outlet hole 58b of one valving area 102, through the valve disk 30 including through the through-hole and the flow passage and other through-hole, and into the drain hole 58d' of the adjacent valving area 104. Similarly in this position, outlet hole 58b' of valving area 104 is connected with drain D of valving area 102. Thus, when there are two valving areas on the rotary valve 10, the outlet of each valving area is connected to the drain of the other valving area. In another embodiment not illustrated, adjacent valving areas can share a common drain.

While two valving areas 102 and 104 are illustrated, more than two valving areas may be included by increasing the number of holes on the body 50 and the valve disk 30. For example, in the illustrated embodiment having two valving areas 102 and 104, the body 50 includes four holes for each valving area 102 and 104. One of the holes of each valving area 102 and 104 is a blocked hole (58c and 58c'). Further, for each valving area 102 and 104, the valve disk 30 has two connecting passages 72 and 72' (each including through-holes that are connected by a flow passage (72e and 72e'). To increase the number of valving areas, the total number of flow passages in the body 50 may be increased by four holes and the total number of connecting passages in the valve disk 30 may be increased by one for each additional valving area.

Figure 28:
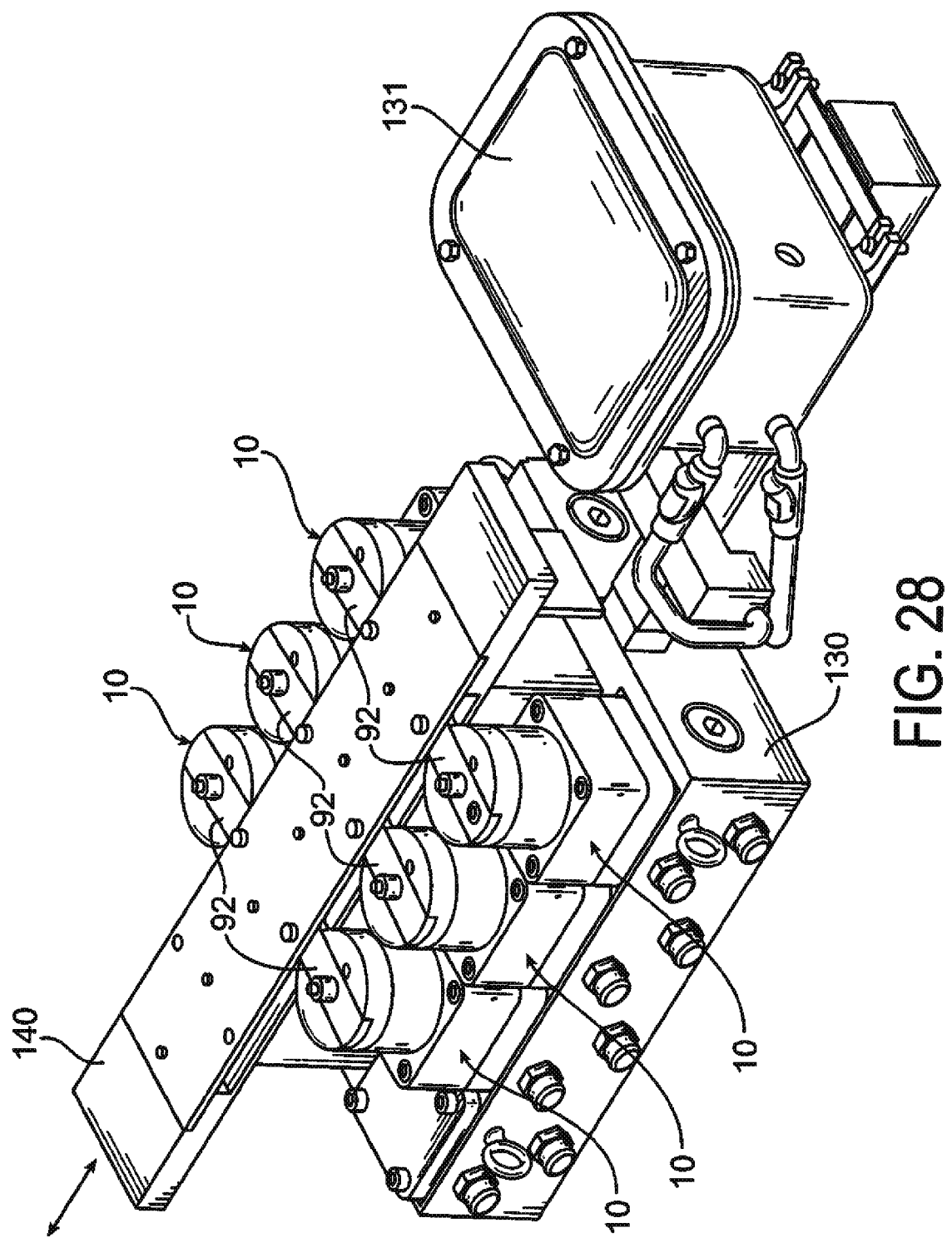
FIG. 28 is a perspective view of an assembly of rotary valves of the type illustrated in FIG. 1, with a locking actuator for actuating and locking together the valve disks of each of the rotary valves of the assembly.

In one application for the rotary valve 10 illustrated in FIG. 28, a plurality of valves 10 of the present invention are mounted on a fluid manifold 130 for controlling flow of a liquid hydrocarbon fuel. The front side or wall 54 of the valve block 50 of each valve 10 is arranged on the manifold 130, with the through holes in the valve block 50 described above aligned with fluid passages in the manifold 130. In this application, each inlet Fi of each valve 10 Is connected through the manifold 130 to a supply source of fuel pressure and flow indicated as P1 and P2 in FIGS. 27a-27c. Each fluid outlet Fo of each valve 10 is connected through the manifold 130 to a different one of the several fluid combustion chambers of a turbine engine not illustrated in the drawings. Each fluid drain D of each valve 10 is connected through the manifold 130 to a drain tank 131. Because each valve 10 includes two or more valving areas or sets of flow passages 102 and 104, each valve 10 provides a structure and function of two valves and controls fluid flow to two separate combustion chambers with a single valve body and a single valve disk. By including two valving areas in each valve 10, with each valving area including an inlet and an outlet, the total number of valves for attachment to the manifold 130 may be decreased by one-half. If additional valving areas are incorporated into the valves 10, a further reduction of valves may take place. In operation of the valve 10 in this one application, the valve 10 is in an off position when in its center position illustrated in FIG. 27a. In the center position, the fluid inlet ports Fi are connected to drain and no fuel is supplied to the combustion chambers. This mode of operation may be used when a different source of fuel not illustrated in the drawings is supplied to the combustion chambers. When the valve 10 is in its clockwise position illustrated in FIG. 27c, the valve 10 is in a purge position in which a purge fluid is supplied to the combustion chambers from a source not illustrated in the drawings. In this position, the fluid outlets Fo of each valving area are connected to drain D of the other valving area. When the valve 10 is in its counterclockwise position illustrated in FIG. 27b, fuel is supplied to the combustion chambers from the sources P1 and P2 (which are the same source in the described application) through the outlets Fo. Other applications for the valve 10 may be used, and the fluid inlets, fluid outlets and other passages may be connected in a different manner or to different devices to suit the requirements of the application. According to an alternate embodiment, the two fluid inlets Fi may be connected to different sources of fluid so that one type of fluid may be supplied to one of the fluid inlets Fi and a different type of fluid may be supplied to the other of the fluid inlets Fi.

A linear actuator 140 is journaled to the slotted portion 94 of the handle 92 of each valve 10. The linear actuator 140 is illustrated in FIG. 28 in a center position, with each valve handle 92 in the center position illustrated in FIGS. 2 and 27a. When the linear actuator 140 is moved to the left from its center position, the handles 92 of the three valves 10 on one side of the linear actuator 140 are rotated in the clockwise direction and the handles of the three valves 10 on the other side of the linear actuator 140 are rotated in the counterclockwise direction illustrated in FIG. 27b. As apparent to those skilled in the art, the holes or flow passages in the valve disks and valve bodies on one side of the linear actuator 140 are as illustrated in FIGS. 1-27, while the holes in the valve disks and valve bodies on the other side of the linear actuator 140 are altered so that opposite direction rotation provides the same inlet, outlet and drain connections. Similarly, movement of the !linear actuator 140 from the center position illustrated in FIG. 28 to the right causes rotation of the handles 92 in an opposite direction to move the valves 10 to the positions illustrated in FIG. 27c. Because all of the valve disks 30 of all of the valves 10 are locked together for rotational movement together, the valves 10 are actuated at the same time by the same linear actuator 140 and all of the valves 10 will always be in the center position or in one of their rotated positions at the same time. In the event of stalling or failure of the linear actuator 140 or of any one of the valves 10, all of the valves 10 will be prevented from rotating. In this manner, the valve 10 and actuator 90,140 may prevent fuel flow to some but not all combustion chambers of the turbine engine and resulting potentially harmful temperature gradients and thermal loads within the turbine engine.

Figure 29:
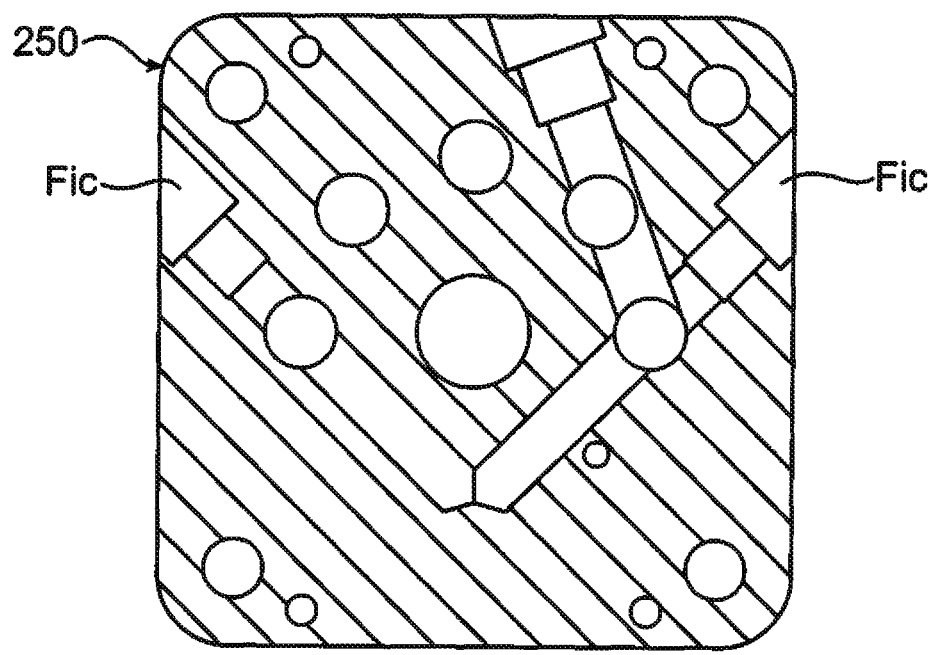
FIG. 29 is a perspective view of another embodiment of one of the valve blocks of the rotary valve shown in FIG. 1.
Figure 30:
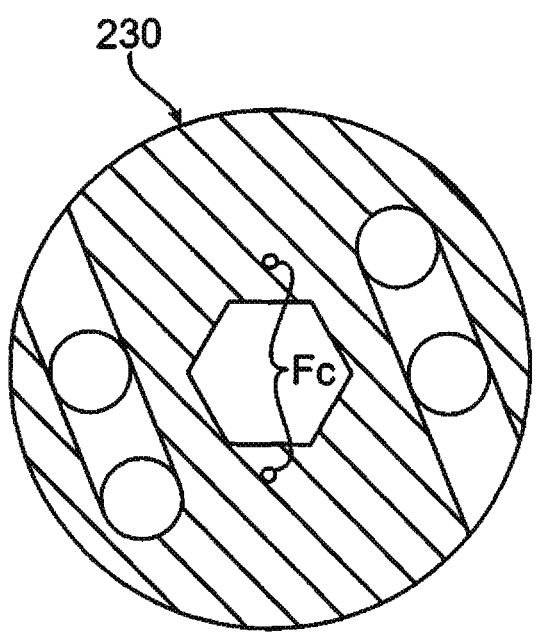
FIG. 30 is a perspective view of another embodiment of the valve disk of the rotary valve shown in FIG. 1.

FIGS. 29 and 30 illustrate additional embodiments of the invention. As illustrated in FIG. 29, another embodiment of a valve body or valve block 250 may be substantially similar to valve block 50 but further Includes a passage Fic which connects the fluid inlets Fi together. Also, as shown in FIG. 30, another embodiment of a valve disk 230 may be substantially similar to valve disk 30 but further includes passages Fc which extend longitudinally through the valve disk 230 and connect the opposite sides of the valve disk 230 to assure substantially equal pressures on the opposites of the valve disk 230. Also, while not illustrated in the drawings, the valve block 12 may be modified to eliminate the blind bores and the seals 34 associated with the blind bores and to add a bearing in the central hole, with the bearing providing a surface against which the valve disk can rotate in place of the seals 34.

The present invention provides a rotary valve having a valve block and a rotatable valve disk. The valve block may include a plurality of flow passage sets, so that a single rotary valve can function as multiple valves and reduce the total number of rotary valves in a fluid system. Each of the flow passage sets may include three or more flow passages or ports, including an inlet passage and an outlet passage and a drain passage. At least one of the flow passages of one flow passage set may be connected with a flow passage of another flow passage set under one operating position of the valve. When the rotary valve is used in a multiple rotary valve system, such as a fuel system for providing fuel to multiple combustion sections or chambers in a rotary turbine, combustion engine, the valve disks of the multiple rotary valves may be interconnected and locked together so that stalling or inability of one valve disk to operate will stop all interconnected valve disks from operating. This will prevent fuel from being supplied to some but not all combustion chambers of the engine and avoid damage to the engine caused by thermal gradients when some but not all combustion chambers receive fuel.

More specifically, the invention provides a rotary valve having a valve block, a cavity having a radially extending wall provided by the valve block, and a valve disk rotatably disposed in the cavity. The valve block may have a first and a second flow passage set, with the first and second flow passage sets being circumferentially spaced apart from one another relative to a longitudinal axis of the valve block and valve disk. The first and second flow passage sets each may include at least three circumferentially spaced apart longitudinally extending flow passages opening longitudinally into the cavity, and the valve disk may include at least one control passage. The valve disk may have a first position in which a valve disk control passage is aligned with two flow passages of the first set of flow passages in the valve block and a second position in which a valve disk control passage is aligned with two flow passages of the second set of flow passages in the valve block.

Further, the valve disk may include a second control passage. The first control passage of the valve disk may be aligned with a first and second flow passage of the first flow passage set and the second control passage of the valve disk may be aligned with a first and second flow passage of the second flow passage set when the valve disk is in the first position. The valve disk may also have a second position circumferentially spaced from its first position. The valve disk first control passage may be misaligned with the first flow passage of the first set of flow passages and the valve disk second control passage may be misaligned with the first flow passage of the second set of flow passages when the valve disk is in the second position. The valve disk first control passage may be aligned with the second and third flow passages of the first set of flow passages and the valve disk second control passage may be aligned with the second and third flow passages of the second set of flow passages when the valve is in the second position.

The valve disk may also have a third position circumferentially spaced from its first and second positions. The valve disk first control passage may be aligned with one of the flow passages of the first set of flow passages and with one of the flow passages of the second set of flow passages when the valve disk is in its third position. The valve disk second control passage may be aligned with one of the flow passages of the second set of flow passages and with one of the flow passages of the first set of flow passages when the valve disk is in its third position.

Each set of flow passages in the valve block may include a fluid drain passage, a fluid inlet passage, and a fluid outlet passage. The fluid inlet passage of each set of fluid flow passages may be circumferentially intermediate the fluid drain passage and the fluid outlet passage. The second position may be circumferentially spaced from the first position in one rotational direction, and the third position may be circumferentially spaced from the first position in a rotational direction opposite the one rotational direction. The fluid inlets may be interconnected or may be isolated from one another.

Each set of flow passages may include four flow passages, and the third and fourth flow passages of each set of flow passages may be interconnected by a connecting passage in the valve block in which the flow passages are disposed. When the valve disk is in the third position, the valve disk first control passage may be aligned with the fourth flow passage of the first set of flow passages and with the first flow passage of the second set of flow passages when the valve disk is in its third position. When the valve disk is in the third position, the valve disk second control passage may be aligned with the fourth flow passage of the second set of flow passages and with the first flow passage of the first set of flow passages when the valve disk is in its third position.

The valve block wall may face longitudinally in one direction, and the valve disk may include a generally flat wall facing longitudinally in a direction opposite the one direction. The first and second sets of flow passages may open longitudinally through the valve block wall, the first and second control passages may open longitudinally through the valve disk wall, and the walls may be substantially adjacent one another. The valve disk may include another generally flat wall facing longitudinally in the one direction, and the first and second control passages may open longitudinally through both valve disk walls. Another valve block may include a generally flat wall facing longitudinally in the opposite direction, the valve disk other wall and the other valve block wall may be substantially adjacent one another, and cylindrical slippers may be disposed in each of the valve block surfaces and engage its adjacent the surface of the valve disk with sliding sealing contact. One of the valve blocks may be a valve cap that has a generally cylindrical recess in which the valve disk is disposed, and the valve cap may include blind holes opening into the cavity. The other valve block may be a valve body in which the first and second sets of flow passages are disposed, and an actuator shaft may extend longitudinally to and be interconnected for rotary movement with the valve disk.

The valve block in which the flow passages are disposed may be a valve body, and the first three mentioned flow passages of each of the first and second sets of flow passages may extend longitudinally from end to end through the valve body. The valve body may be secured to a manifold, and at least one other substantially similar rotary valves may also be secured to the manifold. An actuator may be mechanically locked to each of the valve disks to lock the valve disks together so that the valve disks rotate only in conjunction with one another. The actuator may include an actuator shaft mounted for rotary movement with the valve disk, a handle may be connected to each actuator shaft for rotary movement with the actuator shaft and valve disk, and a linear actuator may be connected to each handle.

Presently several embodiments of the invention are shown and described in detail above. The invention is not, however, limited to these specific embodiments. Various changes and modifications can be made to this invention without departing from its teachings, and the scope of this invention is defined by the claims set out below. Also, while the terms first and second, one and another, left and right, clockwise and counterclockwise, inlet and outlet and drain are used to more clearly describe the structure and operation of the valve 10, it should be understood these terms are used for purposes of clarity and may be interchanged as appropriate. Further, separate components illustrated in the drawings may be combined into a single component, and single components may be provided as multiple parts.

What is claimed is:

1. A rotary valve comprising a valve block, a cavity having a radially extending wall provided by the valve block, a valve disk rotatably disposed in the cavity, the valve block having a first and a second flow passage set, the first and second flow passage sets being circumferentially spaced apart from one another relative to a longitudinal axis of the valve block and valve disk, the first and second flow passage sets each including at least four circumferentially spaced apart longitudinally extending flow passages opening longitudinally into the cavity, the valve disk including a first control passage, the valve disk having a first position in which the first control passage is aligned with two flow passages of the first set of flow passages in the valve block and a second position in which the first control passage is aligned with two flow passages of the first set of flow passages in the valve block, wherein a third flow passage and a fourth flow passage of each set of flow passages are interconnected by a connecting passage in the valve block in which the flow passages are disposed wherein the valve disk has a third position circumferentially spaced from the first and second positions the first control passage is aligned with one of the flow passages of the first set of flow passages and with one of the flow passages of the second set of flow passages when the valve disk is in the third position wherein each set of flow passages includes a fluid drain passage, a fluid inlet passage, a fluid outlet passage, the fluid inlet passage of each set of fluid flow passages is circumferentially intermediate the fluid drain passage and the fluid outlet passage along a minor arc through the fluid drain passage and the fluid outlet passage, the second position is circumferentially spaced from the first position in one rotational direction, and the third position is circumferentially spaced from the first position in a rotational direction opposite the one rotational direction.

2. A rotary valve as set forth claim 1, wherein the fluid inlet passages are isolated from one another and are connectable to different sources of different types of fluids.

3. A rotary valve as set forth claim 1, wherein the fluid inlet passages are connected to one another and are connectable to the same source of fluid.

4. A rotary valve as set forth in claim 1, wherein the valve disk includes first and second flow control passages, the valve disk first control passage is aligned with first and second flow passages of the first set of flow passages in the valve block and the valve disk second control passage is aligned with first and second flow passages of the second set of flow passages in the valve block when the valve disk is in the first position, the valve disk first control passage is aligned with second and third flow passages of the first set of flow passages and the valve disk second control passage is aligned with second and third flow passages of the second set of flow passages when the valve disk is in the second position, the valve disk has a third position circumferentially spaced from the first and second positions, the valve disk first control passage is misaligned with the first and second and third flow passages of the first set of flow passages and is aligned with the fourth flow passage of the first set of flow passages and with the first flow passage of the second set of flow passages when the valve disk is in the third position, the valve disk second control passage is misaligned with the first and second and third flow passages of the second set of flow passages and is aligned with the fourth flow passage of the second set of flow passages and with the first flow passage of the first set of flow passages when the valve disk is in the third position.

5. A rotary valve as set forth in claim 1, wherein the valve block in which the flow passages are disposed is a valve body, and at least three flow passages of each of the first and second sets of flow passages extend longitudinally completely through the valve body.

6. A rotary valve as set forth in claim 1, wherein the valve block in which the flow passages are disposed is a valve body, at least three flow passages of each of the first and second sets of flow passages extend longitudinally from end to end through the valve body, the valve body is secured to a manifold, and a plurality of other rotary valves are also secured to the manifold, wherein each of the plurality of other rotary valves respectively comprise a valve block, a cavity having a radially extending wall provided by the valve block, a valve disk rotatably disposed in the cavity, the valve block having a first and a second flow passage set the first and second flow passage sets being circumferentially spaced apart from one another relative to a longitudinal axis of the valve block and valve disk, the first and second flow passage sets each including at least three circumferentially spaced apart longitudinally extending flow passages opening longitudinally into the cavity, the valve disk including a first control passage, the valve disk having a first position in which the first control passage is aligned with two flow passages of the first set of flow passages in the valve block and a second position in which the first control passage is aligned with two flow passages of the second set of flow passages in the valve block.

7. A rotary valve as set forth in claim 1, wherein the valve block in which the first and second sets of flow passages are disposed is secured to a manifold, at least one other rotary valve is secured to the manifold, wherein each of the at least one other rotary valve respectively comprises a valve block, a cavity having a radially extending wall provided by the valve block, a valve disk rotatably disposed in the cavity, the valve block having a first and a second flow passage set the first and second flow passage sets being circumferentially spaced apart from one another relative to a longitudinal axis of the valve block and valve disk, the first and second flow passage sets each including at least three circumferentially spaced apart longitudinally extending flow passages opening longitudinally into the cavity, the valve disk including a first control passage, the valve disk having a first position in which the first control passage is aligned with two flow passages of the first set of flow passages in the valve block and a second position in which the first control passage is aligned with two flow passages of the second set of flow passages in the valve block, and wherein an actuator is mechanically locked to each of the valve disks to lock the valve disks together so that the valve disks rotate only in conjunction with one another.

8. A rotary valve as set forth in claim 7, wherein each rotary valve includes an actuator shaft mounted for rotary movement with the valve disk, a handle is connected to each actuator shaft for rotary movement with the actuator shaft, and a linear actuator is connected to each handle.

9. A rotary valve as set forth in claim 1, wherein the valve block wall faces longitudinally in one direction, the valve disk includes a generally flat wall facing longitudinally in a direction opposite the one direction, the first and second sets of flow passages open longitudinally through the valve block wall, the first and second control passages open longitudinally through the valve disk wall, and the walls are adjacent one another.

10. A rotary valve as set forth in claim 9, including another valve block, the valve disk includes another generally flat wall facing longitudinally in the one direction, the first and second control passages open longitudinally through both valve disk walls, the other valve block includes a generally flat wall facing longitudinally in the opposite direction, the valve disk other wall and the other valve block wall are adjacent one another, cylindrical slippers are disposed in one of the valve block walls and engage the adjacent surface of the valve disk with sliding sealing contact.

11. A rotary valve as set forth in claim 10, wherein one of the valve blocks is a valve cap that has a generally cylindrical recess in which the valve disk is disposed, the valve cap includes blind holes opening into the cavity, the other valve block is a valve body in which the first and second sets of flow passages are disposed, and an actuator shaft extends longitudinally to and is interconnected for rotary movement with the valve disk.

12. A rotary valve as set forth in claim 1, wherein the valve disk includes a second control passage, the first control passage is aligned with a first and second flow passage of the first flow passage set and the second control passage is aligned with a first and second flow passage of the second flow passage set when the valve disk is in the first position.

13. A rotary valve as set forth in claim 12, wherein the second position is circumferentially spaced from the first position, the valve disk first control passage is misaligned with the first flow passage of the first set of flow passages and the valve disk second control passage is misaligned with the first flow passage of the second set of flow passages when the valve disk is in the second position.

14. A rotary valve as set forth in claim 13, wherein the valve disk first control passage is aligned with the second flow passage and the third flow passage of the first set of flow passages and the valve disk second control passage is aligned with the second flow passage and the third flow passage of the second set of flow passages, when the valve is in the second position.

15. A rotary valve as set forth in claim 14, wherein the valve disk has a third position circumferentially spaced from the first and second positions, the valve disk first control passage is aligned with one of the flow passages of the first set of flow passages and with one of the flow passages of the second set of flow passages when the valve disk is in the third position, the valve disk second control passage is aligned with one of the flow passages of the second set of flow passages and with one of the flow passages of the first set of flow passages when the valve disk is in the third position.

16. A rotary valve as set forth in claim 14, wherein the valve disk has a third position circumferentially spaced from the first and second positions, the valve disk first control passage is misaligned with the second and third flow passages of the first set of flow passages and is aligned with the first flow passage of the first set of flow passages and with one of the flow passages of the second set of flow passages when the valve disk is in the third position, the valve disk second control passage is misaligned with the second and third flow passages of the second set of flow passages and is aligned with the first flow passage of the second set of flow passages and with one of the flow passages of the first set of flow passages when the valve disk is in the third position.

17. A rotary valve comprising a valve block, a cavity having a radially extending wall provided by the valve block, a valve disk rotatably disposed in the cavity, the valve block having a first and a second flow passage set the first and second flow passage sets being circumferentially spaced apart from one another relative to a longitudinal axis of the valve block and valve disk, the first and second flow passage sets each including at least four circumferentially spaced apart longitudinally extending flow passages opening longitudinally into the cavity the valve disk including first and second control passages, the valve disk having a first position in which a valve disk first control passage is aligned with two flow passages of the first set of flow passages in the valve block and a second position in which the valve disk first control passage is aligned with two flow passages of the first set of flow passages in the valve block, wherein third and fourth flow passages of each set of flow passages are interconnected by a connecting passage in the valve block in which the flow passages are disposed, and wherein the valve disk first control passage is aligned with first and second flow passages of the first set of flow passages in the valve block and the valve disk second control passage is aligned with first and second flow passages of the second set of flow passages in the valve block when the valve disk is in the first position, the valve disk first control passage is aligned with second and third flow passages of the first set of flow passages and the valve disk second control passage is aligned with second and third flow passages of the second set of flow passages when the valve disk is in the second position, the valve disk has a third position circumferentially spaced from the first and second positions, the valve disk first control passage is misaligned with the first and second and third flow passages of the first set of flow passages and is aligned with the fourth flow passage of the first set of flow passages and with the first flow passage of the second set of flow passages when the valve disk is in the third position, the valve disk second control passage is misaligned with the first and second and third flow passages of the second set of flow passages and is aligned with the fourth flow passage of the second set of flow passages and with the first flow passage of the first set of flow passages when the valve disk is in the third position.

18. A rotary valve comprising a valve block, a cavity having a radially extending wall provided by the valve block, a valve disk rotatably disposed in the cavity, the valve block having a first and a second flow passage set the first and second flow passage sets being circumferentially spaced apart from one another relative to a longitudinal axis of the valve block and valve disk, the first and second flow passage sets each including at least three circumferentially spaced apart longitudinally extending flow passages opening longitudinally into the cavity the valve disk including at least one control passage, the valve disk having a first position in which a valve disk control passage is aligned with two flow passages of the first set of flow passages in the valve block and a second position in which a valve disk control passage is aligned with two flow passages of the first set of flow passages in the valve block; and wherein the valve block wall faces longitudinally in one direction, the valve disk includes a generally flat wall facing longitudinally in a direction opposite the one direction, the first and second sets of flow passages open longitudinally through the valve block wall, the first and second control passages open longitudinally through the valve disk wall, and the walls are adjacent one another, and another valve block, the valve disk includes another generally flat wall facing longitudinally in the one direction, the first and second control passages open longitudinally through both valve disk walls, the other valve block includes a generally flat wall facing longitudinally in the opposite direction, the valve disk other wall and the other valve block wall are adjacent one another, cylindrical slippers are disposed in one of the valve block walls and engage the adjacent surface of the valve disk with sliding sealing contact.

* * * * *